US010044670B1

(12) United States Patent
Kini

(10) Patent No.: US 10,044,670 B1
(45) Date of Patent: Aug. 7, 2018

(54) CONNECTING TRANSPARENT NETWORK DEVICES TO OPTIMIZE UNIDIRECTIONAL NETWORK TRAFFIC

(75) Inventor: Adityashankar Kini, San Carlos, CA (US)

(73) Assignee: RIVERBED TECHNOLOGY, INC., San Francisco, CA (US)

( * ) Notice: Subject to any disclaimer, the term of this patent is extended or adjusted under 35 U.S.C. 154(b) by 347 days.

(21) Appl. No.: 13/170,063

(22) Filed: Jun. 27, 2011

(51) Int. Cl.
*H04L 29/12* (2006.01)
*H04L 29/06* (2006.01)

(52) U.S. Cl.
CPC .............. *H04L 61/00* (2013.01); *H04L 69/00* (2013.01); *H04L 69/08* (2013.01); *H04L 69/16* (2013.01); *H04L 69/18* (2013.01)

(58) Field of Classification Search
CPC ......... H04L 61/00; H04L 69/00; H04L 69/16; H04L 69/18
USPC .................................................. 709/227–229
See application file for complete search history.

(56) References Cited

U.S. PATENT DOCUMENTS

| 7,551,620 | B1* | 6/2009 | Samuels et al. | 370/394 |
|---|---|---|---|---|
| 7,769,834 | B2* | 8/2010 | Ly et al. | 709/220 |
| 2004/0215746 | A1* | 10/2004 | McCanne et al. | 709/219 |
| 2004/0243703 | A1* | 12/2004 | Demmer et al. | 709/224 |
| 2007/0283023 | A1* | 12/2007 | Ly et al. | 709/227 |
| 2008/0320151 | A1* | 12/2008 | McCanne et al. | 709/228 |
| 2009/0040926 | A1* | 2/2009 | Li et al. | 370/230.1 |
| 2010/0250770 | A1* | 9/2010 | Barreto | H04L 49/90 709/231 |
| 2010/0268829 | A1* | 10/2010 | Ly et al. | 709/227 |
| 2010/0318665 | A1* | 12/2010 | Demmer | H04L 41/12 709/227 |
| 2012/0166483 | A1* | 6/2012 | Choudhary et al. | 707/770 |
| 2013/0091273 | A1* | 4/2013 | Ly et al. | 709/224 |
| 2014/0304412 | A1* | 10/2014 | Prakash et al. | 709/226 |

* cited by examiner

*Primary Examiner* — Minh Chau Nguyen
(74) *Attorney, Agent, or Firm* — Park, Vaughan, Fleming & Dowler LLP; Laxman Sahasrabuddhe

(57) ABSTRACT

Transparent network devices intercept unidirectional network traffic and use bidirectional network protocol messages to discover each other and configure an inner connection. A first transparent network device intercepting unidirectional network traffic between a source and destination will send a bidirectional network protocol message addressed to the destination that includes an indicator of its presence. Additional transparent network devices that intercept this network message each add their own indicator to the message. If no response to the bidirectional network message is received, an error message is received, or a response message is received directly from the destination by one of the transparent network devices, this additional transparent network device deduces that it is the closest transparent network device to the destination and sends a response message addressed to the source that includes an indicator of its presence. The first transparent network device receives the response message and establishes an inner connection.

16 Claims, 4 Drawing Sheets

CONNECTING TRANSPARENT NETWORK DEVICES TO OPTIMIZE UNIDIRECTIONAL NETWORK TRAFFIC

BACKGROUND

The present invention relates to the field of network devices in general and in particular to establishing and maintaining communications between network devices in a transparent manner.

Data communications networks, such as local area networks (LANs) and wide area networks (WANs) often include a variety of network devices for sending, receiving, directing, and optimizing network data traffic. Examples of common network devices include routers, switches, storage-area network front-ends and interfaces, network-address translation (NAT) and firewall devices, and wireless network devices such as access points, bridges, and repeaters. More specialized network devices include standalone print-servers, streaming video and music servers, logging and network management devices, and network monitoring and traffic inspection devices.

WAN optimization devices are another type of network device. WAN optimization devices optimize network traffic to improve network performance in reading and/or writing data over a WAN. WAN optimization devices often operate in pairs on both sides of a WAN or other slower network connection to compress, prefetch, cache, and otherwise optimize network traffic. For example, a WAN optimization device may intercept network traffic on a first LAN from a source network device; compress, prefetch, cache, and otherwise optimize this network traffic; and communicate this optimized network traffic over the WAN to a second WAN optimization device. The second WAN optimization device then decompresses or otherwise processes the optimized network traffic to reconstruct the original network traffic. The second WAN optimization device then communicates the reconstructed version of the original network traffic to the destination network device via a second LAN.

Often, it is desirable for network devices such as WAN optimization devices to operate transparently to other client and server computer systems and network devices. In general, a network device such as a WAN optimization device is considered transparent if any intervening network device, referred to as a middle device, cannot distinguish network traffic between transparent devices from any client-server network traffic associated with the same network connection.

When WAN optimization devices operate transparently, the network connections between a source network device and the first WAN accelerator and between a destination network device and the second WAN accelerator appear to these network devices as a single logical end-to-end connection. These two network connections are referred to collectively as an "outer connection." The network connection between two WAN optimization devices that is used to communicate optimized network traffic is referred to as an "inner connection."

Although inner connections may be created by manually created by configuring WAN optimization devices, it is desirable for WAN optimization devices to automatically establish inner connections as needed. To automatically establish an inner connection between WAN optimization devices, a WAN optimization device first needs to determine if one or more counterpart WAN optimization devices exists on the other side of the WAN network and, if so, to determine its network address.

However, this automatic discovery of WAN optimization devices is complicated because WAN optimization devices operate transparently. For bidirectional network protocols such as TCP, transparent WAN optimization devices may add flags or other indicators to network traffic to signal their existence, network addresses, and other information to any other downstream transparent WAN optimization devices. Transparent WAN optimization devices that receive network traffic including these flags or indicators may add their own flags or indicators to the return network traffic. Because the network protocol is bidirectional, there will always be return network traffic that a transparent WAN optimization device may use to respond to the upstream WAN optimization device. By adding flags or indicators to bidirectional network traffic, transparent WAN optimization devices can detect each others existence and exchange information to establish an inner connection.

However, some network protocols, such as UDP, are unidirectional. For unidirectional network protocols, there may not be any return network traffic. Thus, a transparent WAN optimization device that intercepts unidirectional network traffic including a flag or indicator from an upstream transparent WAN optimization device cannot respond using return network traffic.

BRIEF DESCRIPTION OF THE DRAWINGS

The invention will be described with reference to the drawings, in which.

SUMMARY

Embodiments of the invention establish inner connections between transparent network devices intercepting unidirectional network traffic. Transparent network devices intercepting unidirectional network traffic use bidirectional network protocol messages to discover each other and configure an inner connection. In an embodiment, a first transparent network device intercepting unidirectional network traffic between a source and a destination will send a connection request message addressed to the same destination. This connection request message will use a bidirectional network protocol and include an indicator of the presence of the first transparent network device.

One or more additional transparent network device may intercept the bidirectional network connection request. In an embodiment, each additional transparent network device that intercepts this message will add its own indicator to the message and forward it on to its destination. Additional transparent network devices that intercept the connection request message will wait for a connection request response message. If no response is received, an error message is received, or a connection request response message is received directly from the destination, then an additional transparent network device deduces that it is the closest transparent network device to the destination. In response to this determination, it sends a connection request response message addressed to the source that includes an indicator of its presence. Additional transparent network devices that intercept connection request response messages including an indicator from another transparent network device will forward this message on unchanged.

Once the first transparent network device has received the connection request response message from an additional transparent network device, it can establish an inner connection. An embodiment of the invention repeats this process to detect changes in the network. If the network configuration or routing of unidirectional network traffic changes, an embodiment of the invention establishes a new inner connection between the transparent network devices closest to the source and destination of the unidirectional network traffic.

DETAILED DESCRIPTION OF ILLUSTRATIVE EMBODIMENTS

Figure 1:
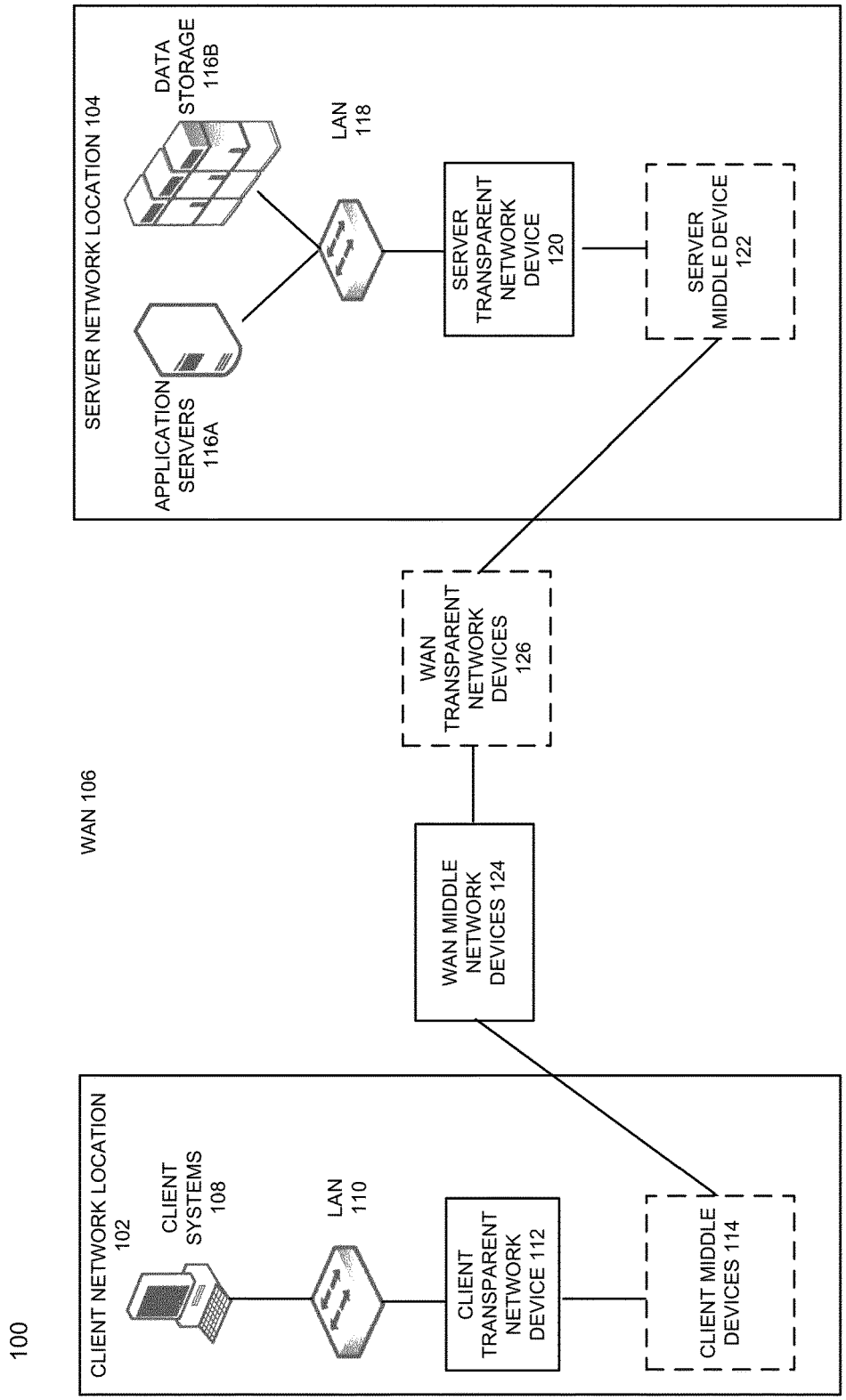
FIG. 1 illustrates an example system including transparent network devices suitable for use with embodiments of the invention.

FIG. 1 illustrates an example system 100 including transparent network devices suitable for use with embodiments of the invention. System 100 includes a client local area network (LAN) location 102 and a server LAN location 104 connected via a wide-area network (WAN) 106, such as the internet or a private WAN. Client LAN location 102 includes one or more client systems 108. Client systems 108 may include computers and/or other electronic devices capable of sending and/or receiving data via a network. Client LAN location 102 includes a LAN 110 for facilitating communication within client LAN location 102 via wired and/or wireless network connections. LAN 110 can include network devices such as gateways, firewalls, switches, routers, wireless network interfaces, and network monitoring devices.

Client LAN location 102 includes a client transparent network device 112. Examples of client transparent network device 112 include a WAN optimization device and a network monitoring device. LAN 110, and thus client systems 108 and client transparent network device 112, is connected with WAN 106.

Similarly, server LAN location 104 includes one or more server systems 116, including application servers 116A and/or data storage systems 116B. Server systems 116 may include computers and/or other electronic devices capable of sending and/or receiving data via a network. In this application, the terms client and server are used to describe roles performed by different computer systems and are not intended as a limitation on the type of computer or electronic device; in general, any type computer or electronic device capable of communicating via a network may act as a client and/or a server. Server LAN location 104 includes a LAN 118 for facilitating communication within server LAN location 118 via wired and/or wireless network connections. LAN 118 can include network devices such as gateways, firewalls, switches, routers, wireless network interfaces, and network monitoring devices.

Server LAN location 104 includes a server transparent network device 120, such as a WAN optimization device or a network monitoring device. LAN 118, and thus server systems 116 and client transparent network device 120, is connected with WAN 106.

In an embodiment, system 100 may optionally include one or more middle devices, such as firewalls, proxies, network address translation (NAT) devices. Middle devices are any network devices connected between client transparent network device 112 and server transparent network device 120. Middle devices may include client middle devices 114 located at client network location 102, WAN middle network devices 124 located on the WAN 106, and/or server middle devices 122 located at server network location 104. Additionally, WAN 106 may optionally include one or more transparent network devices 126.

Middle devices may interfere with the operation of transparent network devices. For example, middle devices can mistakenly block or misdirect communications between transparent network devices, interfering with the establishment and operation of an inner channel between transparent network devices. Additionally, network packets addressed to a computer system or network device but intended for a transparent network device may be directed around the transparent network device.

As discussed above, the automatic discovery of transparent network devices and the establishment of an inner connection between them is further complicated when using unidirectional network protocols, such as UDP. This is because the unidirectional network protocol does not require any return network traffic. Thus, a transparent network device that intercepts unidirectional network traffic including a flag or indicator from an upstream transparent network device cannot respond using return network traffic. Moreover, if the receiving transparent network device tries to contact the upstream transparent network device directly using a separate network connection, middle devices such as firewalls may block the separate network connection.

Figure 2:
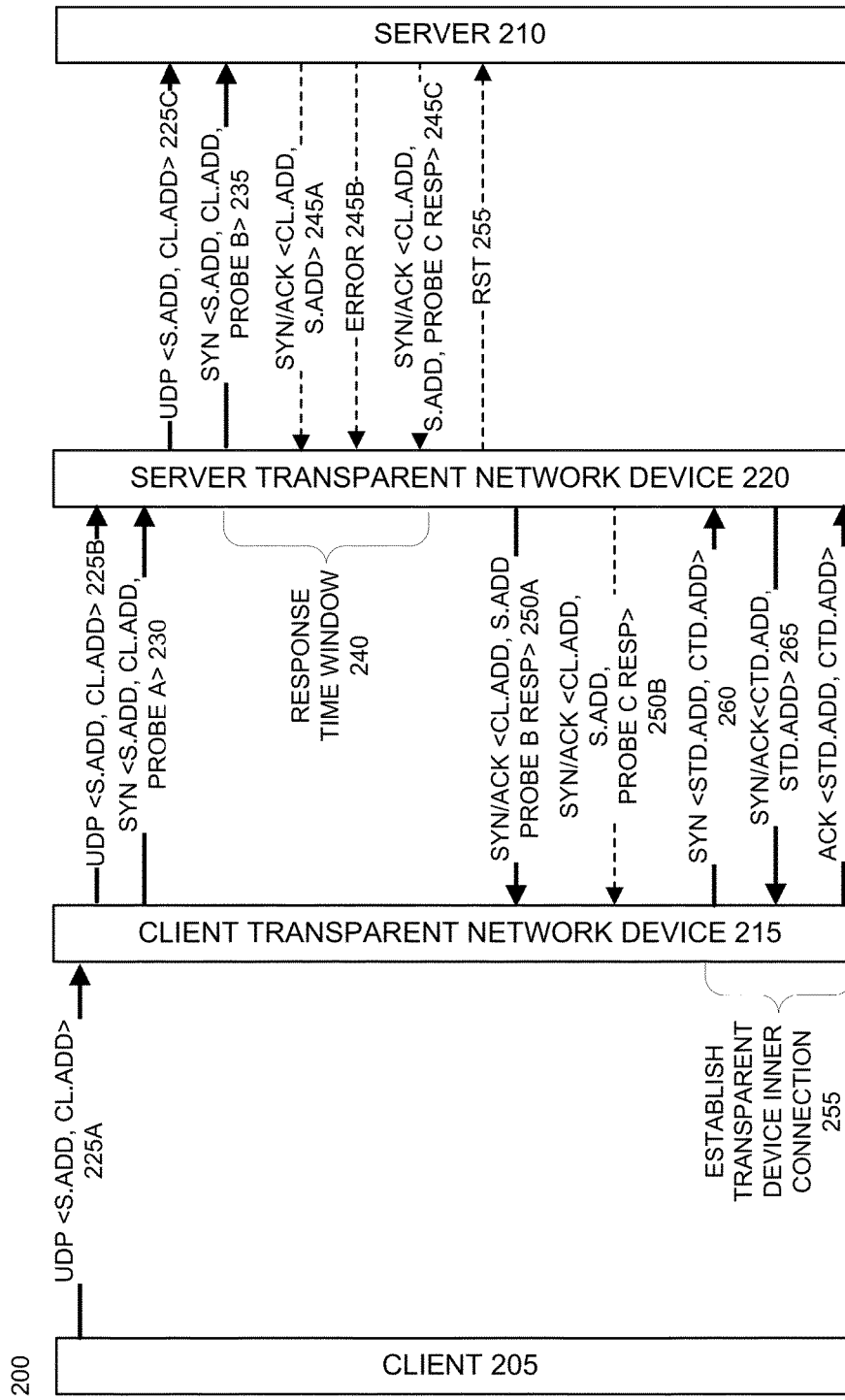
FIG. 2 illustrates an example exchange of messages used to establish inner network connections between transparent network devices using a unidirectional network protocol according to an embodiment of the invention.

FIG. 2 illustrates an example exchange 200 of messages used to establish inner network connections between transparent network devices using a unidirectional network protocol according to an embodiment of the invention. In an embodiment, an inner connection should be established between two transparent network devices only if these two transparent network devices are the closest transparent network devices to the network traffic source and destination, respectively. In this example 200, an inner connection should be established between client and server transparent network devices 215 and 220 if there are no other transparent network devices that are closer to the client 205 and server 210, respectively.

Exchange 200 begins with a client 205 sending message 225A via a unidirectional network protocol, such as UDP, to a server 210. Embodiments of the invention may also be used in conjunction with other unidirectional or connectionless network transport protocols, such as the IP protocol (without TCP) and variations of UDP, such as UDP Lite and Cyclic UDP. Message 225A includes a destination address set to the server network address and a source address set to the client network address.

Message 225A is intercepted by a client transparent network device 215. Client transparent network device 215 forwards a copy of the received message 225A on towards its destination in the form of message 225B. Additionally, client transparent network device 215 initiates a second network connection between the client 205 and the server 210 via a bidirectional network protocol, such as TCP. In an embodiment, client transparent network device 215 generates a TCP SYN message 230 addressed to the server 210. Even though this SYN message 230 originates with client transparent network device 215, it includes a source address set to the client network address. In a further embodiment, the second network connection is configured to mimic network traffic typically allowed through firewalls and other middle devices. For example, the second network connection may be set to network port 80 to mimic an outgoing web connection request.

SYN message 230 includes a flag or other indicator to signal to any downstream transparent network devices that the client LAN location includes the client transparent network device 215. In an embodiment, the flag, shown as "PROBE A" in this example, is included as a TCP option in SYN message 230. Therefore, middle network devices and the server 210 typically ignore this flag or indicator. In a further embodiment, the indicator may include other information, such as the type of network protocol or network traffic that the client transparent network device wishes to optimize (e.g. UDP traffic in this example).

As discussed above, an inner connection should be established by the client transparent network device 215 only if there is no other transparent network devices that are closer to the client 205. If the client transparent network device 215 receives a unidirectional network protocol message 225A and a corresponding SYN message including a flag or other indicator of an upstream transparent network device, then client transparent network device 215 deduces that it is not the transparent network device closest to client 205. Conversely, if the client transparent network device 215 receives the unidirectional network protocol message 225A and does not receive a corresponding SYN message, as shown in example 200, then client transparent network device 215 deduces that it is the transparent network device closest to the client 205.

SYN message 230 is carried by the client LAN, WAN, and/or server LAN towards its destination, which is server 210. During this transit, the SYN message 230 will be intercepted by server transparent network device 220 (after potentially passing through one or more middle devices). Server transparent network device 220 is adapted to recognize the flag from the client transparent network device 215 in the SYN message 230. In response to intercepting this SYN message 230, server transparent network device 220 generates a similar SYN message 235. SYN message 235 has the same source and destination addresses as SYN message 230 (i.e. client 205 and server 210), but includes a different flag or indicator, shown as "PROBE B" in this example. This flag or indicator in SYN message 235 is adapted to signal to any other downstream transparent network devices that server transparent network device 220 exists. SYN message 235 is forwarded towards its destination. Additionally, server transparent network device forwards the unidirectional network traffic towards its destination in the form of message 225C.

In general, any downstream transparent network devices receiving a SYN message including an indicator from an upstream transparent network device will respond similarly to server transparent network device 220 by generating a similar SYN message including a different flag or indicator to signal the existence of the intercepting transparent network device and forwarding the newly generated SYN message with its flag or indicator towards its destination network address. This may be repeated for any arbitrary number of downstream transparent network devices, or omitted if there are no transparent network devices downstream of server transparent network device 220.

Following the transmission of SYN message 235, server transparent network device 220 starts a response time window to track the time that it waits for a response to SYN message 235. The response time window may last for any time period configured by a system administrator or other user. During the response time window 240, one of four possible responses may occur. First, the server 210 may respond to the SYN message 235 with a SYN/ACK message 245A. SYN/ACK message 245A does not include any flag or indicator from a downstream transparent network device. Because of this, the server transparent network device 220 deduces that there are no further transparent network devices between itself and server 210. Thus, server transparent network device 220 determines that it should establish an inner connection with client transparent network device 215.

Similarly, if the server transparent network device 220 receives an error message 245B from the server 210 during response time window 240, for example rejecting the request in SYN message 235 to create the second network connection, the server transparent network device 220 deduces that there are no further transparent network devices between itself and server 210. Thus, server transparent network device 220 determines that it should establish an inner connection with client transparent network device 215.

Additionally, if the server transparent network device 220 does not receive any response to SYN message 235 during response time window 240, for example because this message is either ignored by server 210 or blocked by a firewall or other middle network device, the server transparent network device 220 deduces that there are no further transparent network devices between itself and server 210. Thus, server transparent network device 220 determines that it should establish an inner connection with client transparent network device 215.

Finally, if the server transparent network device 220 receives a SYN/ACK message 245C during the response time window 240 that does include a flag or indicator from a downstream transparent network device, the server transparent network device 220 deduces that there is at least one additional transparent network devices between itself and server 210. Thus, server transparent network device 220 determines that it should not establish an inner connection with client transparent network device 215. As described below, the server transparent network device 220 forwards the received SYN/ACK message 245C towards its destination without modifying the flag or other indicator, presumably to be intercepted by the transparent network device closest to the client 205, for example client transparent network device 215.

In the event that the server transparent network device 220 deduces that it is the closest transparent network device to the server 210, it establishes an inner connection with the client transparent network device 215 as follows. First, if the server transparent network device 220 received a SYN/ACK message 245A from the server 210 acknowledging the request for the second network connection, server transparent network device 220 sends a reset message 225 to the server 210 to terminate this connection, because the request for the second network connection is only used to discover transparent network devices. This message 255 may be omitted if the server 210 responds with an error message 245B or does not respond at all.

After optionally sending reset message 255, the server transparent network device 220 then begins establishing the inner connection with the client transparent network device 215. Server transparent network device sends a SYN/ACK message 250 directed back to the client 205. SYN/CK message 250 includes a flag or indicator (shown as "PROBE B RESP" in example 200) adapted to signal to the client transparent network device 215 that it should establish an inner connection with server transparent network device 220. In a further embodiment, the flag or indicator also includes a network address associated with the server transparent network device 265 that can be used to establish the inner connection. If server transparent network device 220 received a SYN/ACK message 245A from the server 210, then SYN/ACK message 250 may be a copy of SYN/ACK message 245A with a flag or indicator added by server transparent network device 220. If the server transparent network device 220 did not receive a SYN/ACK message 245A, then the server transparent network device 220 may generate all of the SYN/ACK message 250 itself.

SYN/ACK message 250 is directed to the client 205, but is intercepted by client transparent network device 215. Client transparent network device 215 deduces the existence of the downstream transparent network device from the inclusion of the flag or indicator in message 250. Following the interception of message 250, client transparent network device 215 establishes the inner connection using messages in set 255.

In an embodiment, the inner connection is a TCP connection between the client and server transparent network devices 215 and 220. In this embodiment, client transparent network device 215 establishes the inner connection by sending a SYN message addressed specifically to the server transparent network device 220. The server transparent network device 220 then responds with a SYN/ACK message 265 addressed to the client transparent network device 265. Upon successfully receiving the SYN/ACK message 265, client transparent network device 215 sends an ACK message 270 to the server transparent network device 270.

In alternate embodiments, the set of messages 255 used to establish the inner connection between the client and server transparent network devices 215 and 220 may be different depending on the network protocol used for the inner connection as well as the network configuration. In still other embodiments, the client and server transparent network devices 215 and 220 may encapsulate multiple outer connections between one or more pairs of clients and servers within a single inner connection.

Figure 3:
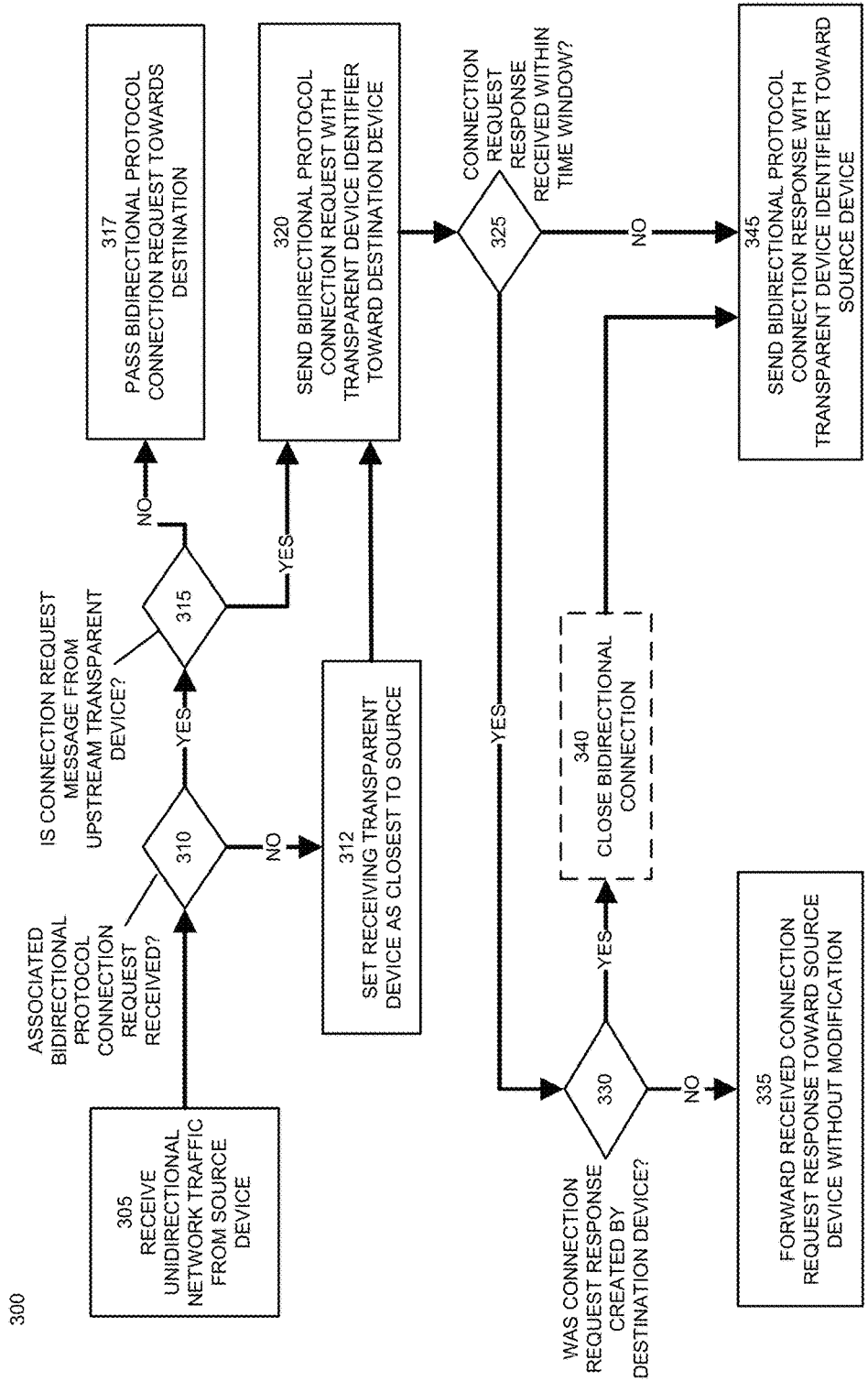
FIG. 3 illustrates a method of processing network traffic during the establishment of an inner network connection using a unidirectional network protocol according to an embodiment of the invention.

As described above, a transparent network device, such as server transparent network device 220, receiving unidirectional network protocol network traffic will establish an inner connection only if there is an upstream transparent network device and if the receiving transparent network device is the closest transparent network device to the traffic destination. To make these determinations, FIG. 3 illustrates a method 300 of processing network traffic during the establishment of an inner network connection using a unidirectional network protocol according to an embodiment of the invention.

Step 305 receives unidirectional network traffic by a transparent network device, such as a server transparent network device. Step 305 forwards the unidirectional network traffic towards its destination. Step 310 determines if the receiving transparent network device also receives a bidirectional network protocol connection request that is potentially associated with the unidirectional network traffic. In an embodiment, a bidirectional network protocol connection request may be considered potentially associated with the unidirectional network traffic if it has the same source and/or destination network addresses as recently received unidirectional network traffic.

If the receiving transparent network device does not receive an associated a bidirectional network protocol connection request message, then method 300 proceeds to step 312. Step 312 determines that because the receiving transparent network device does not receive an associated a bidirectional network protocol connection request message, it can be assumed that this transparent network device is closest to the source of the unidirectional network traffic.

Following step 312, step 320 generates a bidirectional network protocol connection request message including a flag or indicator as described above. The flag or indicator in this connection request message signals the existence of the receiving transparent network device to any downstream transparent network devices.

Returning to step 310, if the receiving transparent network device does receive an associated bidirectional network protocol connection request message, method 300 proceeds from step 310 to step 315. Step 315 determines if the connection request was generated by an upstream transparent network device or by the source network device. In an embodiment, the presence of a flag or indicator in the connection requests signals that it was generated by an upstream transparent network device.

If the bidirectional network protocol connection request was not generated by an upstream transparent network device, then method 300 proceeds to step 317 and passes the connection request on to its destination unchanged.

Conversely, if step 315 determines that the bidirectional network protocol connection request was generated by an upstream transparent network device, then method 300 proceeds to step 320 and sends a modified version of the connection request message towards to destination. In an embodiment, the modified connection request message includes a flag or other indicator of the existence of the receiving transparent network device. Regardless of whether step 320 is performed following step 315 or step 312, an embodiment of step 320 configures the connection request message to have the same source and destination addresses as the unidirectional network traffic and includes a flag or other indicator of the presence of the receiving transparent network device.

Following step 320, an embodiment of the receiving transparent network device waits for a response to the connection request message. Step 325 determines if the receiving transparent network device has received a response to the connection request message within a time window. This response may be an error message or a connection request response message. If not, then it is assumed that the receiving transparent network device is the closest transparent network device to the destination and step 345 sends a bidirectional network protocol connection response message back towards to the source of the unidirectional network traffic, so that it may be intercepted by the upstream transparent network device. In an embodiment, the connection response message includes a flag or indicator of the presence of the receiving transparent network device. This enables the upstream transparent network device to establish an inner connection with the receiving transparent network device.

Conversely, if the receiving transparent network device does receive a response to the connection request message within the time window, method 300 proceeds from step 325 to step 330. Step 330 determines whether the response to the connection request message was generated by the destination network device (such as a server receiving the unidirectional network traffic) or by another transparent network device downstream of the receiving transparent network device. In an embodiment, step 330 makes this determination based on a flag or indicator included in the received connection request response message.

If the received connection request response message was not generated by the destination network device, method 300 proceeds from step 330 to step 335. An embodiment of step 335 forwards the connection request response message towards the source network device (such as a client generating the unidirectional network traffic), so that it may be intercepted by the upstream transparent network device. In an embodiment, the connection request response message is forwarded by the receiving transparent network device without modification to at least the flag or indicator included in this message by the downstream transparent network device. The upstream transparent network device may then use the contents of this connection request response message to establish an inner connection with the downstream transparent network device, bypassing or passing through the receiving transparent network device unmodified.

Returning to step 330, if step 330 determines that the connection response message was generated by the destination network device or if it receives an error message from the destination network device, method 300 proceeds from step 330 to step 340. Optional step 340 closes the bidirectional network connection initiated by the previously received connection request message. In an embodiment, step 340 sends a connection reset message to the destination network device to do this. If the receiving transparent network device received an error message from the destination network device, step 340 may be omitted.

Following step 340, method 300 proceeds to step 345. As described above, step 345 sends a bidirectional network protocol connection response message back towards to the source of the unidirectional network traffic (such as a client), so that it may be intercepted by the upstream transparent network device. In an embodiment, the connection response message includes a flag or indicator of the presence of the receiving transparent network device. This enables the upstream transparent network device to establish an inner connection with the receiving transparent network device.

In a further embodiment, the exchange of messages used to establish an inner connection in response to unidirectional network traffic is repeated to detect changes in the network, such as changes in the routing of unidirectional network traffic. For example, a client transparent network device may send a bidirectional network protocol connection request message at intervals of once a minute to ensure that there have been no changes in the network. Similarly, the server transparent network device may monitor network traffic for both unidirectional network traffic and any bidirectional network protocol connection requests as described above to ensure that it is remains the closest transparent network device to the destination network device. Additionally, an embodiment of the client transparent network device may perform method 300 as well to ensure that changes in the network do not change its location with respect to the client network device.

Once a pair of transparent network devices have established an inner connection, they may utilize this inner connection for a variety of purposes. For example, transparent network devices may perform WAN optimizations, including compression, deduplication, protocol optimization, forward error correction, and operating system and application-specific network optimizations; quality of service (QoS); and network monitoring. Embodiments of the invention may use the inner connection to carry an optimized form of the unidirectional network traffic or just for configuration and signaling between transparent network devices. As an example of the latter, an upstream transparent network device may add additional information, such as a marker, counter, or timestamp, to unidirectional network traffic. The downstream transparent network device then intercepts the unidirectional network traffic and strips away this additional information before forwarding it on to its destination. The downstream transparent network device can use this additional information to measure network delay and/or loss and optionally return its measurements to the upstream network device via the inner channel.

Figure 4:
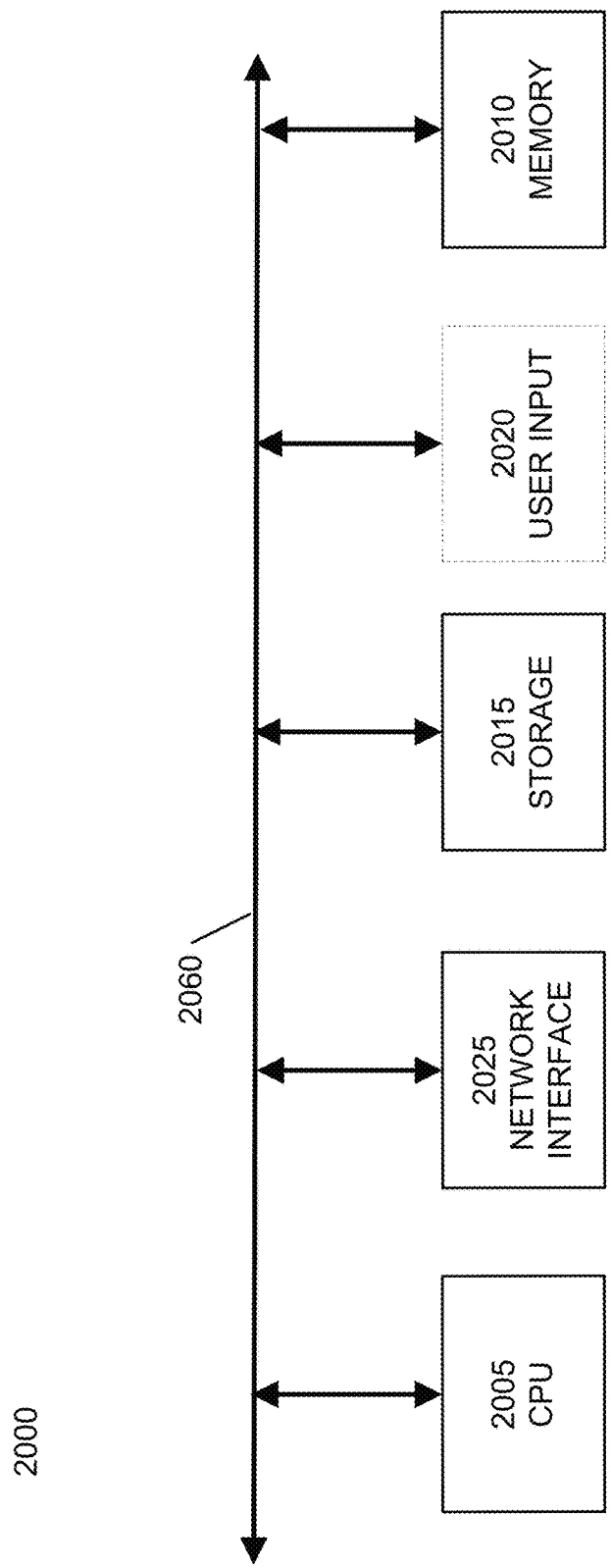
FIG. 4 illustrates an example computer system suitable for implementing embodiments of the invention.

FIG. 4 illustrates a computer system suitable for implementing embodiments of the invention. FIG. 4 is a block diagram of a computer system 2000, such as a personal computer or other digital device, suitable for practicing an embodiment of the invention. Embodiments of computer system 2000 may include dedicated networking devices, such as wireless access points, network switches, hubs, routers, hardware firewalls, WAN and LAN network traffic optimizers and accelerators, network attached storage devices, storage array network interfaces, and combinations thereof.

Computer system 2000 includes a central processing unit (CPU) 2005 for running software applications and optionally an operating system. CPU 2005 may be comprised of one or more processing cores. Memory 2010 stores applications and data for use by the CPU 2005. Examples of memory 2010 include dynamic and static random access memory. Storage 2015 provides non-volatile storage for applications and data and may include fixed or removable hard disk drives, flash memory devices, ROM memory, and CD-ROM, DVD-ROM, Blu-ray, or other magnetic, optical, or solid state storage devices.

In a further embodiment, CPU 2005 may execute virtual machine software applications to create one or more virtual processors capable of executing additional software applications and optional additional operating systems. Virtual machine applications can include interpreters, recompilers, and just-in-time compilers to assist in executing software applications within virtual machines. Additionally, one or more CPUs 2005 or associated processing cores can include virtualization specific hardware, such as additional register sets, memory address manipulation hardware, additional virtualization-specific processor instructions, and virtual machine state maintenance and migration hardware.

Optional user input devices 2020 communicate user inputs from one or more users to the computer system 2000, examples of which may include keyboards, mice, joysticks, digitizer tablets, touch pads, touch screens, still or video cameras, and/or microphones. In an embodiment, user input devices may be omitted and computer system 2000 may present a user interface to a user over a network, for example using a web page or network management protocol and network management software applications.

Computer system 2000 includes one or more network interfaces 2025 that allow computer system 2000 to communicate with other computer systems via an electronic communications network, and may include wired or wireless communication over local area networks and wide area networks such as the Internet. Computer system 2000 may support a variety of networking protocols at one or more levels of abstraction. For example, computer system may support networking protocols at one or more layers of the seven layer OSI network model. An embodiment of network interface 2025 includes one or more wireless network interfaces adapted to communicate with wireless clients and with other wireless networking devices using radio waves, for example using the 802.11 family of protocols, such as 802.11a, 802.11b, 802.11g, and 802.11n.

An embodiment of the computer system 2000 may also include one or more wired networking interfaces, such as one or more Ethernet connections to communicate with other networking devices via local or wide-area networks.

The components of computer system 2000, including CPU 2005, memory 2010, data storage 2015, user input devices 2020, and network interface 2025 are connected via one or more data buses 2060. Additionally, some or all of the components of computer system 2000, including CPU 2005, memory 2010, data storage 2015, user input devices 2020, and network interface 2025 may be integrated together into one or more integrated circuits or integrated circuit packages. Furthermore, some or all of the components of computer system 2000 may be implemented as application specific integrated circuits (ASICS) and/or programmable logic.

Further embodiments can be envisioned to one of ordinary skill in the art. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for communicating data in a network, wherein the network comprises a source device, a destination device, and a plurality of transparent network devices, the method comprising:
    the source device sending unidirectional network traffic via a unidirectional network protocol to the destination device;
    an upstream transparent network device intercepting a unidirectional network protocol message (UNPM) in the unidirectional network traffic;
    in response to intercepting the UNPM, the upstream transparent network device generating a bidirectional network protocol connection request message (BNPCRM) of a bidirectional network protocol, wherein the BNPCRM includes a first indicator that signals a presence of the upstream transparent network device to other transparent network devices;
    the upstream transparent network device sending the BNPCRM to the destination device via the bidirectional network protocol;
    the upstream transparent network device forwarding the UNPM toward the destination device via the unidirectional network protocol;
    a downstream transparent network device intercepting the BNPCRM;
    in response to determining that (1) the BNPCRM includes the first indicator, and (2) the downstream transparent network device is a closest transparent network device to the destination device, the downstream transparent network device establishing a bidirectional network protocol connection (BNPC) with the upstream transparent network device by using the bidirectional network protocol; and
    using the BNPC to optimize the unidirectional network traffic.

2. The method of claim 1, wherein the downstream transparent network device establishing the BNPC with the upstream transparent network device comprises:
    sending, by the downstream transparent network device, a bidirectional network protocol connection request response message to the source device via the bidirectional network protocol, wherein the bidirectional network protocol connection request response message includes a second indicator that signals the presence of the downstream transparent network device to the upstream transparent network device.

3. The method of claim 1, wherein the unidirectional network protocol includes UDP.

4. The method of claim 1, wherein the bidirectional network protocol includes TCP.

5. The method of claim 1, wherein the BNPC assists the downstream transparent network device to perform WAN optimization on the unidirectional network traffic.

6. The method of claim 1, wherein the BNPC assists the downstream transparent network device to perform network QoS.

7. The method of claim 1, wherein the BNPC assists the downstream transparent network device to perform network monitoring of network traffic communicated via the unidirectional network protocol.

8. The method of claim 1, wherein the downstream transparent network device strips away additional information in the unidirectional network traffic before forwarding the unidirectional network traffic to the destination device, wherein the downstream transparent network device uses the additional information to measure at least a network delay, and wherein the downstream transparent network device sends a least the measured network delay to the upstream transparent network device via the BNPC.

9. An apparatus for communicating data in a network, comprising:
    a source device to send unidirectional network traffic via a unidirectional network protocol to a destination device;
    an upstream transparent network device to:
        intercept a unidirectional network protocol message (UNPM) in the unidirectional network traffic,
        in response to intercepting the UNPM, generate a bidirectional network protocol connection request message (BNPCRM) of a bidirectional network protocol, wherein the BNPCRM includes a first indicator that signals a presence of the upstream transparent network device to other transparent network devices,
        send the BNPCRM to the destination device via the bidirectional network protocol, and
        forward the UNPM toward the destination device via the unidirectional network protocol; and
    a downstream transparent network device to:
        intercept the BNPCRM, and
        in response to determining that (1) the BNPCRM includes the first indicator, and (2) the downstream transparent network device is a closest transparent network device to the destination device, establish a bidirectional network protocol connection (BNPC) with the upstream transparent network device by using the bidirectional network protocol, wherein the BNPC is used to optimize the unidirectional network traffic.

10. The apparatus of claim 9, wherein the downstream transparent network device establishing the BNPC with the upstream transparent network device comprises:
    sending, by the downstream transparent network device, a bidirectional network protocol connection request response message to the source device via the bidirectional network protocol, wherein the bidirectional network protocol connection request response message includes a second indicator that signals the presence of the downstream transparent network device to the upstream transparent network device.

11. The apparatus of claim 9, wherein the unidirectional network protocol includes UDP.

12. The apparatus of claim 9, wherein the bidirectional network protocol includes TCP.

13. The apparatus of claim 9, wherein the BNPC assists the downstream transparent network device to perform WAN optimization on the unidirectional network traffic.

14. The apparatus of claim 9, wherein the BNPC assists the downstream transparent network device to perform network QoS.

15. The apparatus of claim 9, wherein the BNPC assists the downstream transparent network device to perform network monitoring of network traffic communicated via the unidirectional network protocol.

16. The apparatus of claim 9, wherein the downstream transparent network device strips away additional information in the unidirectional network traffic before forwarding the unidirectional network traffic to the destination device, wherein the downstream transparent network device uses the additional information to measure at least a network delay, and wherein the downstream transparent network device sends at least the measured network delay to the upstream transparent network device via the BNPC.

\* \* \* \* \*